United States Patent [19]
Kanda et al.

[11] Patent Number: 5,223,301
[45] Date of Patent: Jun. 29, 1993

[54] SURIMI MANUFACTURING PROCESS

[75] Inventors: Kazuaki Kanda, Tochigi; Kuninori Hanabusa, Yokohama; Nobuyoshi Takeuchi, Yokosuka, all of Japan

[73] Assignee: Nichiro Corporation, Tokyo, Japan

[21] Appl. No.: 850,101

[22] Filed: Mar. 12, 1992

[51] Int. Cl.$^5$ .............................. A23L 1/325
[52] U.S. Cl. ........................ 426/643; 426/518
[58] Field of Search ............ 426/643, 506, 518

[56] References Cited

U.S. PATENT DOCUMENTS

| | | | |
|---|---|---|---|
| 4,176,202 | 11/1979 | Decker et al. | 426/643 X |
| 4,207,354 | 6/1980 | Haga et al. | 426/524 |
| 4,215,153 | 7/1980 | Kai et al. | 426/643 |
| 4,284,653 | 8/1981 | Shigeoka et al. | 426/312 |
| 4,464,404 | 8/1984 | Ueno et al. | 426/332 |
| 4,769,256 | 9/1988 | Matsumoto et al. | 426/643 |
| 4,910,039 | 3/1990 | Fujita et al. | 426/643 X |
| 4,935,192 | 6/1990 | Porter et al. | 426/56 |
| 4,992,295 | 2/1991 | Ueno et al. | 426/643 |

FOREIGN PATENT DOCUMENTS 3-123468  5/1991  Japan.

OTHER PUBLICATIONS

Reppond et al. J. Food Sci. 52:505, 1987.

Primary Examiner—Arthur L. Corbin
Attorney, Agent, or Firm—Davis Wright Tremaine

[57] ABSTRACT

There is disclosed an improved surimi manufacturing process employing a mince crushing step that increases mince surface area to volume ratios. The effect of increasing surface area to volume ratios of mince particles, depending upon when in the surimi manufacturing process it is used, will improve overall yield of surimi and surimi by-products and/or reduce the requirement for fresh water for the surimi manufacturing process.

9 Claims, 3 Drawing Sheets

SURIMI MANUFACTURING PROCESS

TECHNICAL FIELD OF THE INVENTION

This invention relates to an improved process for the production of surimi from the flesh of fish by increasing the surface area to volume ratio of minced meat.

BACKGROUND OF THE INVENTION

Surimi, the minced and refined flesh of fish, is prepared from a variety of fish, such as Alaska pollock, mackerel, Pacific whiting, hake from the South Pacific and South Atlantic, Pacific flatfish such as arrowtooth flounder and sardine. Such fish is filleted or eviscerated and split, then deboned and/or minced to obtain the flesh of the fish. Fish flesh is processed into surimi by a surimi process. Surimi can be processed from the flesh of fish on board processing ships or in land-based operations. The difference between at-sea processing and on land processing is that generally, fresh water is a scarce and expensive commodity for a factory vessel at sea.

Generally, surimi processing has involved obtaining appropriate fish material, removing fish muscle from frame by filleting, followed by mincing, washing, dewatering and refining. Under certain processing conditions, whole or split fish may be put through a meat separator/deboner without filleting. Minced meat is produced when flesh pieces are passed through a meat separator or mincer with drum openings of approximately 5 mm diameter. The mince is washed to remove water-soluble proteins and then dewatered. The cycle of washing and dewatering is usually repeated at least one more time. The washed, dewatered mince is refined or strained, then adjusted for moisture. Lastly, the meat is mixed with additives, packaged, frozen and stored ultimately to make a surimi product. More specifically, fresh water is used during the repeated washing procedure to remove water-soluble proteins and other materials from the minced meat.

Washing essentially concentrates the myofibrillar proteins of fish muscle (particularly actin and myosin) by washing away water-soluble proteins, pigments, and tissue debris that are also present in fish muscle. Where large quantities of fresh water are available, this can be accomplished by thoroughly washing and dewatering the minced meat in about three cycles.

In the standard surimi manufacturing process, the mince is often insufficiently washed onboard a factory trawler processing ship in an effort to conserve fresh water. The outside of the mince particles are efficiently washed but the inside does not contact water enough to effectively remove water soluble proteins and pigments remaining in the interior. To compensate for this problem, the washing and dewatering cycle is repeated, often several times to complete removal of water-soluble proteins, pigments and other tissue debris. As a result, fresh water is consumed in large quantities to complete the washing process. Depending on the condition of the fish, the resulting mince may become excessively hydrated during repeated washing, resulting in production of lower quality surimi, as determined by gel strength characteristics.

However, onboard a factory trawler processing ship, fresh water is often in short supply and can cost in the range of $15 to $25 per ton to produce fresh water from sea water by an energy-intensive reverse osmosis process. Therefore, there is a need in the art to develop an efficient surimi process that uses minimal amounts of fresh water for use onboard a factory trawler at sea. Moreover, even in a surimi processing operation on land, where fresh water is plentiful, repeated washing cycles, using large quantities of water, can reduce overall yield and quality due to excessive hydration. Accordingly, there is a need in the art to improve overall yield without increasing water consumption of surimi processing. There is a further need in the art to reduce water consumption without sacrificing quality of yield.

SUMMARY OF THE INVENTION

The present invention improves the surimi manufacturing process to add a step to crush or flatten the mince at one or two places during a surimi manufacturing process. When mince is crushed before washing there is an increase in the surface area to volume ratio of the mince to allow for more efficient utilization of fresh water. When refiner waste mince is crushed, the inventive process can effect improvement in yield and quality of lower grade surimi products.

The mince crushing step flattens the mince meat into disks or elongated disks by setting a mince crusher device to produce crushed mince of a thickness that is no greater than half the diameter of original mince or from about 50% to about 5% of the diameter of the original mince. Preferably, the mince crusher device is calibrated to maintain a clearance gap between rotating drums of the device in the range of from about 0.5 mm to about 2.0 mm. Most preferably, the mince crusher device gap is approximately 1.0 mm.

The mince crusher device comprises two adjustable rollers, a roller and a belt, or two belts that have an adjustable gap for crushing mince meat into a desired thickness. The gap between the rollers and/or belts adjusts to a distance of from about 0.5 mm to about 2.0 mm. Such a device does not cause the mince to be heated and provides a smooth ingress and egress passage to and from the rollers so as to prevent cutting the fish muscle fibers. The mince crusher further separates mince muscle protein muscle fibers without cutting the fibers. Most preferably, the device can take extruded mince meat and flatten it into disk or elongated disk shapes that have increased surface area to volume ratios.

A surimi manufacturing process having a mince crushing step prior to washing, allows the process to eliminate repeat washing and dewatering cycles, thus saving fresh water and improving gel strength of the surimi product. A surimi manufacturing process comprising a mince crushing step utilizing refining waste in a lower grade surimi manufacturing line also improves the overall yields of lower grade surimi from fish flesh when compared to a conventional surimi manufacturing process that does not include a mince crushing step. The present invention also comprises a surimi manufacturing process having a mince crushing step prior to washing and after refining, utilizing refiner waste.

DETAILED DESCRIPTION OF THE INVENTION

Figure 1:
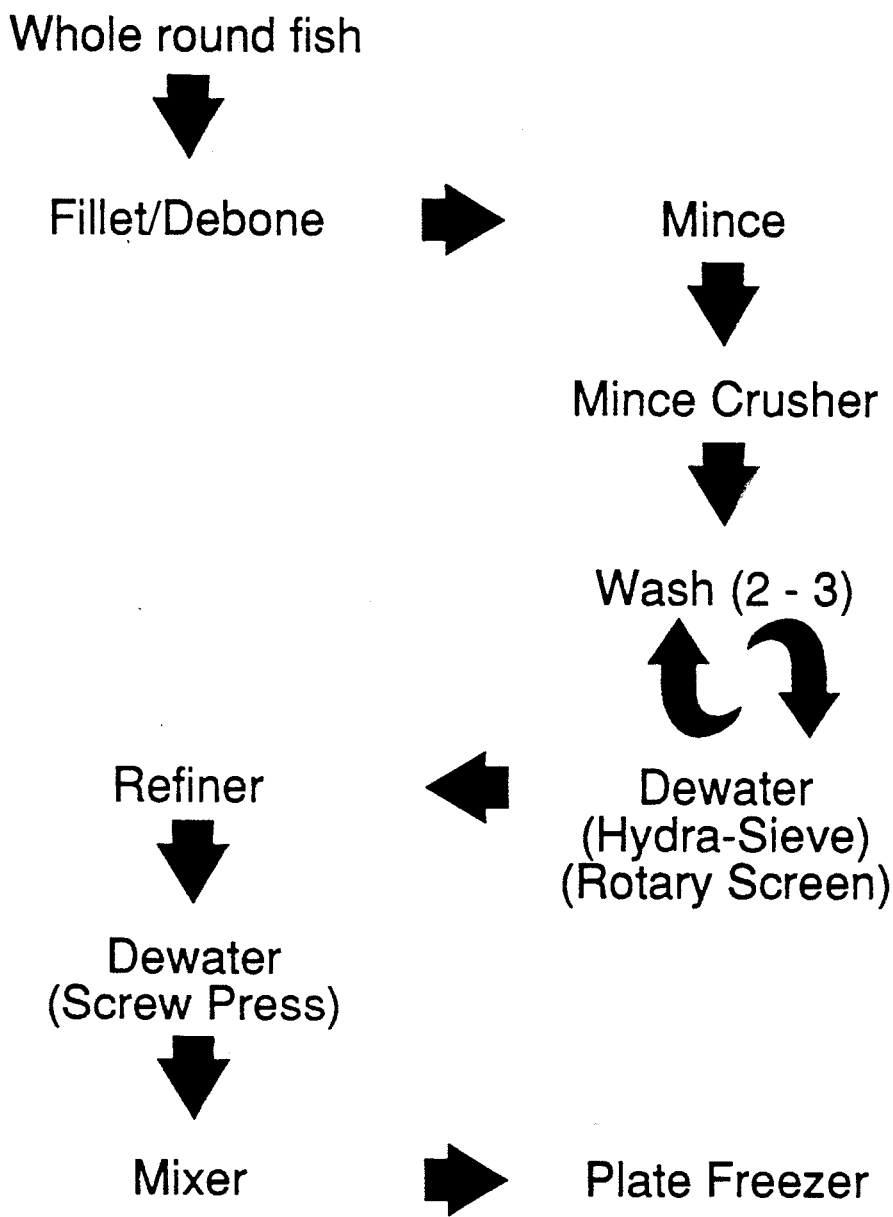
FIG. 1 is a process flow diagram of the inventive surimi manufacturing process utilizing a mince crushing step before washing to reduce the number of repeat washing and dewatering cycles and to save fresh water, while improving gel strength of both higher and lower grade surimi.
Figure 2A:
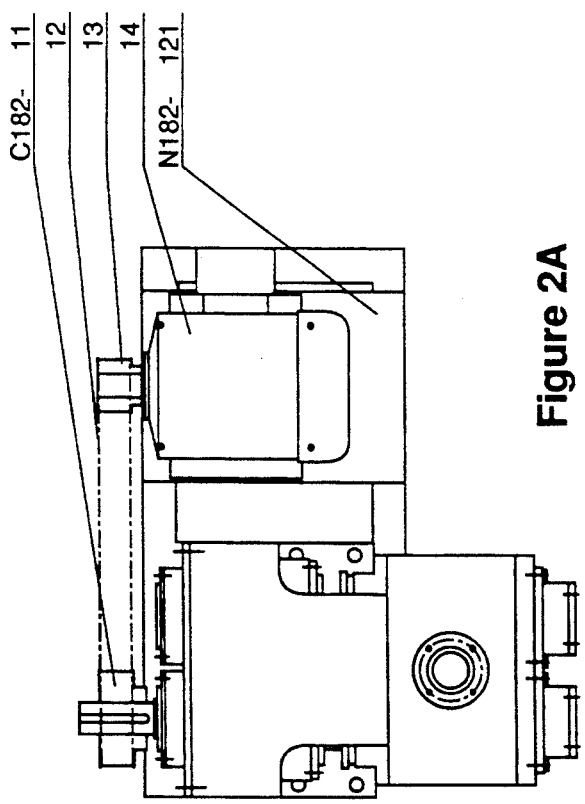
FIG. 2 is a mechanical drawing of a mince crusher device employing two rollers.
Figure 2C:
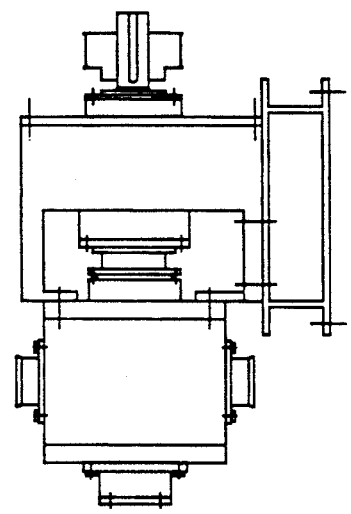
Figure 2B:
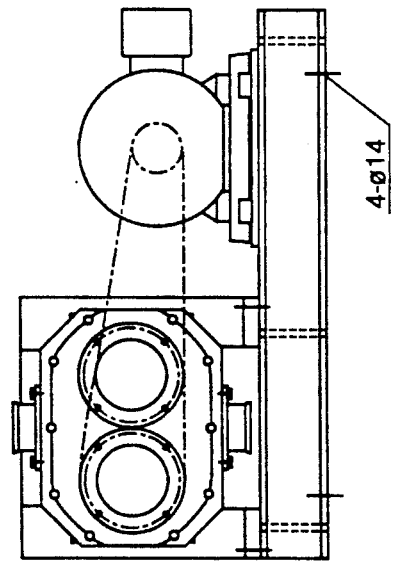
Figure 3:
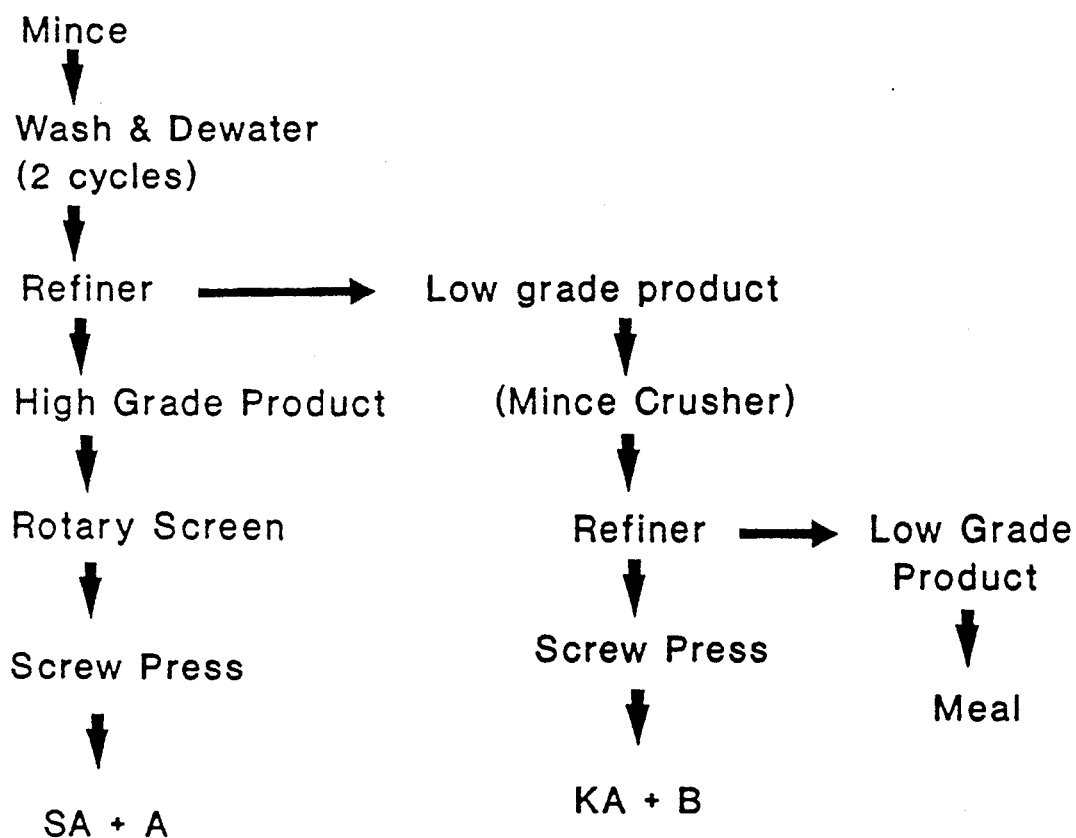
FIG. 3 is a process flow diagram showing the use of a mince crusher device to process waste product from the first refiner. This process was used in Example 2.

The inventive surimi manufacturing process crushes mince meat either before washing to allow more efficient removal of water-soluble proteins, pigments and tissue debris and/or at another point during surimi manufacturing to achieve better separation of bones and connective tissue from the mince that results in higher and better quality yield. The net result is that washing can be completed with less fresh water for a given quantity of fish flesh than the conventional surimi manufacturing process. The cost savings achieved onboard a factory trawler processing ship are high because production of fresh water from sea water is an energy intensive process. Moreover, more efficient washing of crushed mince over extruded mince can help to eliminate a second or third cycle of washing and dewatering that is characteristic of surimi processing and often results in excessive hydration of the mince.

Surimi manufacturing employs a process whereby myofibrillar proteins of fish muscle from fish flesh are concentrated by removing the majority of water-soluble proteins, pigments and tissue debris (e.g., sarcoplasmic proteins, blood and blood vessels, connective tissue, etc.) present in fish flesh. Where large quantities of water are readily available at minimal cost, this is usually accomplished by washing and dewatering minced fish in three cycles. Onboard a factory trawler, however, fresh water is limited and expensive. The present invention provides a new surimi manufacturing process that utilizes less fresh water in the process and improves yield of surimi from starting fish flesh. The present invention is based upon the principle that increasing the surface area to volume ratio of mince provides more efficient washing of fish flesh.

The surimi manufacturing process begins with any of a number of fish suitable for surimi manufacture. These include, for example, Alaska pollock, mackerel, Pacific whiting, Peruvian hake, arrowtooth flounder and sardine. The fresh fish are scaled or skinned, washed and filleted by standard procedures. The fillets are called fish flesh and often still contain small quantities of undesirable bone, connective tissue and possibly skin, in addition to flesh, comprising muscle. The fish flesh is minced through a mesh drum of a meat-separator having a diameter of from about 3 mm to about 5.5 mm. This procedure produces mince having a diameter corresponding approximately to the diameter of the mesh drum. The mince will still contain pin bones, connective tissue and possibly skin.

Conventional surimi processing will next wash the mince with copious amounts of fresh water to remove water-soluble proteins, pigments and other tissue debris. Washing is followed by a dewatering step. Dewatering can be accomplished, for example, using a device with a small diameter (for example 0.5 mm) mesh screen. The rotary screen and Hydra-Sieve Model 552 (Alfa Laval KK, Japan) are examples of such a device. The conventional surimi manufacturing process will require the mince to be repeated through a washing and dewatering cycle to more thoroughly remove water-soluble proteins. The net result of a second or even a third cycle of washing and dewatering is production of high-quality surimi but at the cost of copious quantities of fresh water and reduced yield because each washing removes some of the mince to waste. Gel strength or quality can also be reduced.

In one embodiment, the inventive process inserts a crushing step after the mincing step. This step crushes the mince to a flat shape with a crushing device. The result is that the mince becomes flatter and has increased surface area for a given volume of mince. Therefore, surface area to volume ratio increases because the mince flattens in shape while the volume of the mince remains the same. Preferably, the gap distance of the mince crusher is no more than half the diameter of the mesh openings of the mincer drum. Most preferably, the gap distance is from about 5% to about 50% of the diameter distance of the mesh openings of the mincer drum. Typically the mesh drum openings have a diameter of about 5.0 mm. Therefore, the gap distance of the mince crusher is from about 0.5 mm to about 2.0 mm. The result is that crushed mince increases the surface area to volume ratio significantly.

In another embodiment of the invention, refiner waste that proceeds to a lower grade surimi line, is first crushed before it is further refined into lower grade surimi. Placement of a mince crushing step before further refinement improves both yield and quality of lower grade surimi. The crushing step helps to separate undesirable bones, skin and connective tissue from desirable flesh material to improve and facilitate separation in further refining steps. This effects improvements in yield and quality of lower grade product.

In a third embodiment of the present invention, a mince crushing step is provided before washing and to crush refiner waste.

A mince crusher device can comprise any device, usually having rollers and/or belts, that can flatten mince into disk or elongated disk shapes. In a preferred embodiment, a mince crusher device comprises two rollers that turn about an axis in opposite directions at the sam rotation speed at the circumference. A gap formed between the rollers is of a uniform distance of from about 0.5 mm to about 2.0 mm. Minced meat is continuously pressed through the gap formed between the rollers. In consideration of different characteristics of mince meat formed from different species of fish, the gap distance can be adjusted within a wide range.

The inventive surimi manufacturing process performs a mince crushing step with a mince crushing device in at least one and up to three times within the overall surimi manufacturing process. The choice of when to perform the mince crushing step during the surimi manufacturing process determines the benefits from this step. For example, when the mince is crushed before washing, there is more efficient use of water for washing the mince. Water can be used sparingly because crushing the mince allows the wash water greater access to water soluble components of the fish muscle. Therefore, there is more efficient washing using less water. Yield and quality of yield can also be improved with a crushing step either before the first washing and/or before subsequent refining steps, because crushing the mince also loosens pin bones, connective tissue and other debris of any muscle fibers. The net result is a greater yield of surimi of all grades, depending upon where the mince crusher is placed in the surimi manufacturing process.

Refining is the next step in both the conventional and inventive surimi manufacturing processes. Refining usually involves further straining the washed and dewatered mince through a refiner. This step further removes remaining bones and connective tissue. Refiner waste material, having a higher amount of undesirablee bones, connective tissue and skin, is further processed into lower grade surimi. A mince crushing step of refiner waste will improve yield and quality of lower grade surimi.

The refined mince is dewatered, preferably by a screw press method. Lastly, the mince is processed by adding various additives, such as sugar and other cryoprotectants. This procedure is discussed in detail in U.S. Pat. Nos. 4,284,653 and 4,207,354, the disclosures of which are incorporated by reference herein.

The surimi can be packaged and stored at this point.

The following examples are designed to illustrate several features of the present invention and are not intended to limit the scope of the claimed invention.

EXAMPLE 1

This example illustrates a comparison of surimi manufacturing processes using conventional processes and inventive processes with a mince crusher device. The following comparative experiment was conducted aboard the surimi factory trawler 77 Akebono Maru during a pollock fishing season in the Bering Sea. The experiment was designed to determine improved mince dimensions to improve yield of the surimi.

Four different processes were used to process mince. Process A was the conventional or control process and consisted of 5.0 mm mince (100 kg) mixed with 100 L of fresh water and agitated for three minutes. Process B investigated the effects of using a smaller diameter screen for forming the mince. In B, 100 kg of 3.0 mm mince was mixed with 100 L of fresh water and agitated for three minutes. Process C (the inventive process) used 100 kg of 5.0 mm mince, crushed in a 1.0 mm gap mince crusher, mixed with 100 L of fresh water and agitated for three minutes. The mince crusher used for process C was made with two drums rotating in opposite directions from each other with a uniform gap distance of 1.0 mm. Process D used 5.0 mm mince, mixed with 40 to 60 L of fresh water which was refined using a 2.5 mm to 3.0 mm mesh screen size, then mixed again with 40 to 60 L of fresh water (total 100 L of fresh water) and agitated both times for three minutes. All of the mince from all four different processes was processed for surimi. All four processes washed and dewatered using a Hydra-Sieve Model 552 (Alfa Laval KK, Japan) with a 0.5 mm mesh screen. Waste water from the Hydra-Sieve was collected, centrifuged to collect fine particles of meat and analyzed (Table 2). Washed mince retained by the Hydra-Sieve was added to 100 L of fresh water in a wash tank and agitated for three minutes and then dewatered. The second dewatering was in a rotary screen device with a 0.5 mm mesh. Waste water from this second dewatering procedure was collected, centrifuged to obtain fine particles of meat and then analyzed (Table 2). Washed mince from the rotary screen was refined using a Fukoku RE-150 refiner. The final dewatering step used a Fukoku HX-150 screw press. The screw press product (press cake) was blended with sugar (4% w/w), sorbitol (4% w/w) and polyphosphate (0.15% w/w) and pyrophosphate (0.15% w/w) to form surimi. The final product was frozen for storage at −35° C.

Yields and recoveries were calculated based upon the dry weight of the original whole round fish entering the surimi line, which contained 83.1% moisture.

The four way comparison experiment was conducted five times using different ages of fish. Experiment 1 used fish immediately after capture and up to 4 hours postharvest. Experiment 2 used fish 4–8 hours after harvest, experiment 3 used fish between 8 to 15 hours after harvest, experiment 4 used fish between 15 and 20 hours after harvest and experiment 5 used the oldest fish harvested at least 20 hours before processing.

Table 1 (below) shows comparisons of yield, weight, moisture and percentage recovery for a high grade surimi produced for five experiments using the four different processes. The inventive process (C) achieved approximately 1% greater recovery of high grade surimi when compared with the conventional process (A). This effect was most pronounced with fish that were used up to 8 hours after harvesting (experiments 1 and 2) where the use of the mince crusher improved yield by 1.6% and 1.3%, respectively.

TABLE I

| | Round Fish | | Mince | | | Press Cake | | | |
| --- | --- | --- | --- | --- | --- | --- | --- | --- | --- |
| | Weight kg | Moisture % | Weight kg | Moisture % | Adjusted Weight kg | Weight kg | Moisture % | Adjusted Total Yield (I) kg | Recovery % |
| | Improvements in Yield of High Grade Surimi (Main Production) | | | | | | | | |
| 1A | 396.2 | 83.1 | 100.0 | 85.0 | 88.8 | 26.0 | 81.1 | 29.1 | 7.3 |
| 1B | 396.2 | 83.1 | 100.0 | 85.0 | 88.8 | 26.6 | 80.9 | 30.1 | 7.6 |
| 1C | 396.2 | 83.1 | 100.0 | 88.8 | 88.8 | 31.3 | 80.9 | 35.4 | 8.9 |
| 1D | 396.2 | 83.1 | 100.0 | 85.0 | 88.8 | 26.5 | 81.0 | 29.8 | 7.5 |
| 2A | 353.2 | 83.1 | 100.0 | 84.3 | 92.9 | 30.7 | 81.2 | 34.2 | 9.7 |
| 2B | 353.2 | 83.1 | 100.0 | 84.3 | 92.9 | 31.2 | 81.5 | 34.2 | 9.7 |
| 2C | 353.2 | 83.1 | 100.0 | 84.3 | 92.9 | 34.7 | 81.1 | 38.8 | 11.0 |
| 2D | 353.2 | 83.1 | 100.0 | 84.3 | 92.9 | 30.5 | 83.0 | 30.7 | 8.7 |
| 3A | 358.3 | 83.1 | 100.0 | 84.5 | 91.7 | 31.7 | 81.6 | 34.5 | 9.6 |
| 3B | 358.3 | 83.1 | 100.0 | 84.5 | 91.7 | 30.7 | 82.0 | 32.7 | 9.1 |
| 3C | 358.3 | 83.1 | 100.0 | 84.5 | 91.7 | 34.8 | 82.0 | 37.1 | 10.3 |
| 3D | 358.3 | 83.1 | 100.0 | 84.5 | 91.7 | 34.8 | 82.3 | 36.4 | 10.2 |
| 4A | 350.4 | 83.1 | 100.0 | 84.9 | 89.3 | 30.5 | 80.6 | 35.0 | 10.0 |
| 4B | 350.4 | 83.1 | 100.0 | 84.9 | 89.3 | 33.7 | 81.9 | 36.1 | 10.3 |
| 4C | 350.4 | 83.1 | 100.0 | 84.9 | 89.3 | 32.1 | 81.3 | 35.5 | 10.1 |
| 4D | 350.4 | 83.1 | 100.0 | 84.9 | 89.3 | 33.7 | 81.0 | 37.9 | 10.8 |
| 5A | 334.7 | 83.1 | 100.0 | 84.5 | 91.7 | 31.4 | 81.0 | 35.3 | 10.5 |
| 5B | 334.7 | 83.1 | 100.0 | 84.5 | 91.7 | 33.1 | 82.0 | 35.3 | 10.5 |
| 5C | 334.7 | 83.1 | 100.0 | 84.5 | 91.7 | 33.0 | 80.9 | 37.3 | 11.1 |
| 5D | 334.7 | 83.1 | 100.0 | 84.5 | 91.7 | 31.2 | 80.8 | 35.4 | 10.6 |
| Average Yields Combining Data from 5 Trials (Experiments 1 through 5) | | | | | | | | | |

TABLE I-continued

| | Round Fish | | Mince | | Press Cake | | | | |
|---|---|---|---|---|---|---|---|---|---|
| | Weight kg | Moisture % | Weight kg | Moisture % | Adjusted Weight kg | Weight kg | Moisture % | Adjusted Total Yield (I) kg | Recovery % |
| A | 358.6 | 83.1 | 100.0 | 84.6 | 90.9 | 30.1 | 81.1 | 33.6 | 9.4 |
| B | 358.6 | 83.1 | 100.0 | 84.6 | 90.9 | 31.1 | 81.7 | 33.7 | 9.4 |
| C | 358.6 | 83.1 | 100.0 | 84.6 | 90.9 | 33.2 | 81.2 | 36.8 | 10.3 |
| D | 358.6 | 83.1 | 100.0 | 84.6 | 90.9 | 31.3 | 81.6 | 34.1 | 9.5 |

The use of the mince crusher (process C) also increased total yield of high grade surimi as determined by meat recovered from waste water recovered from the Hydra-Sieve rotary screen and screw press (Table 2 below). The average yield for high grade surimi recovered from waste water using the inventive process was 7.7 kg compared to 2.8 kg using the conventional process (A).

TABLE 2

| | Hydra-Sieve | | | Rotary Screen | | | Screw Press | | | Total Yield (II) kg |
|---|---|---|---|---|---|---|---|---|---|---|
| | Weight kg | Moisture % | Adjusted Weight kg | Weight kg | Moisture % | Adjusted Weight kg | Weight kg | Moisture % | Adjusted Weight kg | |
| | Improvements in Yield of High Grade Surimi from Decanter Recovered Meat | | | | | | | | | |
| 1A | 0.0 | 0.0 | 0.0 | 0.0 | 0.0 | 0.0 | 2.2 | 87.7 | 1.6 | 1.6 |
| 1B | 3.4 | 87.3 | 2.5 | 1.6 | 87.0 | 1.2 | 2.6 | 88.4 | 1.8 | 5.5 |
| 1C | 3.6 | 88.1 | 2.5 | 2.9 | 86.2 | 2.4 | 3.1 | 88.8 | 2.1 | 7.0 |
| 1D | 8.5 | 86.2 | 6.9 | 2.3 | 88.3 | 1.6 | 3.1 | 89.8 | 1.9 | 10.4 |
| 2A | 0.9 | 88.6 | 0.6 | 1.0 | 85.8 | 0.8 | 2.8 | 89.1 | 1.8 | 3.2 |
| 2B | 4.0 | 87.3 | 3.0 | 2.0 | 86.7 | 1.7 | 2.3 | 89.5 | 1.4 | 6.0 |
| 2C | 3.3 | 87.5 | 2.4 | 0.6 | 84.8 | 0.5 | 2.6 | 88.7 | 1.7 | 4.6 |
| 2D | 7.3 | 86.7 | 5.7 | 1.9 | 88.3 | 1.3 | 2.1 | 90.1 | 1.2 | 8.2 |
| 3A | 1.9 | 87.3 | 1.4 | 1.8 | 86.9 | 1.4 | 2.3 | 88.5 | 1.6 | 4.4 |
| 3B | 5.3 | 86.4 | 4.3 | 0.9 | 86.2 | 0.7 | 2.1 | 89.0 | 1.4 | 6.4 |
| 3C | 8.2 | 86.5 | 6.6 | 3.6 | 86.2 | 2.9 | 2.4 | 89.3 | 1.5 | 11.0 |
| 3D | 5.5 | 86.5 | 4.4 | 3.5 | 86.4 | 2.8 | 2.5 | 89.7 | 1.5 | 8.7 |
| 4A | 0.5 | 88.3 | 0.3 | 0.2 | 89.2 | 0.1 | 2.0 | 87.6 | 1.5 | 1.9 |
| 4B | 4.3 | 86.8 | 3.4 | 2.7 | 87.2 | 2.0 | 2.5 | 88.5 | 1.7 | 7.1 |
| 4C | 3.4 | 86.3 | 2.8 | 1.9 | 86.8 | 1.5 | 2.4 | 88.9 | 1.6 | 5.9 |
| 4D | 3.4 | 87.1 | 2.6 | 6.6 | 87.1 | 5.0 | 2.7 | 88.1 | 1.9 | 9.5 |
| 5A | 0.0 | 0.0 | 0.0 | 0.7 | 88.5 | 0.5 | 2.6 | 86.9 | 2.0 | 2.5 |
| 5B | 5.5 | 87.2 | 4.2 | 2.4 | 86.6 | 1.9 | 2.5 | 88.3 | 1.7 | 7.8 |
| 5C | 6.2 | 86.1 | 5.1 | 3.3 | 86.3 | 2.7 | 2.9 | 87.5 | 2.1 | 9.9 |
| 5D | 5.4 | 86.8 | 4.2 | 8.1 | 86.0 | 6.7 | 2.9 | 88.4 | 2.0 | 12.9 |
| | Average Yields Combining Data from 5 Trials (Experiments 1 through 5) | | | | | | | | | |
| A | 0.7 | 88.1 | 0.5 | 0.7 | 87.0 | 0.6 | 2.4 | 88.0 | 1.7 | 2.8 |
| B | 4.5 | 87.0 | 3.5 | 1.9 | 86.8 | 1.5 | 2.4 | 88.7 | 1.6 | 6.6 |
| C | 4.9 | 86.7 | 3.9 | 2.5 | 86.3 | 2.0 | 2.7 | 88.6 | 1.8 | 7.7 |
| D | 6.0 | 86.6 | 4.8 | 4.5 | 86.8 | 3.5 | 2.7 | 89.2 | 1.7 | 10.0 |

The data presented in Table 3 (below) show that process C resulted in 1% lower yield of low grade surimi than process A. The combined yields taken from Tables 1, 2 and 3 (see Table 3 below) show that the use of a mince crusher in process C increased total recovery about 2% compared to control process A.

TABLE 3

| | Surimi Line Refiner | | | Experiment 4 Refiner | | | Total Yield (III) kg | Grand Total Yield (I + II + III) | Total Recovery (%) |
|---|---|---|---|---|---|---|---|---|---|
| | Weight kg | Moisture % | Adjusted Weight kg | Weight kg | Moisture % | Adjusted Weight kg | | | |
| | Improvements in Yield of Low Grade Surimi Processed from Refiner Waste | | | | | | | | |
| 1A | 26.1 | 89.2 | 16.7 | | | | 16.7 | 47.4 | 12.0 |
| 1B | 16.2 | 89.8 | 9.8 | | | | 9.8 | 45.4 | 11.5 |
| 1C | 26.4 | 90.1 | 15.5 | | | | 15.5 | 57.9 | 14.6 |
| 1D | 7.7 | 90.4 | 4.4 | 6.0 | 85.2 | 5.3 | 9.7 | 49.9 | 12.6 |
| 2A | 27.5 | 89.5 | 17.1 | | | | 17.1 | 54.5 | 15.4 |
| 2B | 18.7 | 89.6 | 11.5 | | | | 11.5 | 51.7 | 14.6 |
| 2C | 24.2 | 89.6 | 14.9 | | | | 14.9 | 58.3 | 16.5 |
| 2D | 13.3 | 90.9 | 7.2 | 5.3 | 86.8 | 4.1 | 11.3 | 50.2 | 14.2 |
| 3A | 23.5 | 89.3 | 14.9 | | | | 14.9 | 53.8 | 15.0 |
| 3B | 14.9 | 90.0 | 8.8 | | | | 8.8 | 47.9 | 13.4 |
| 3C | 25.7 | 89.9 | 15.4 | | | | 15.4 | 63.5 | 17.7 |
| 3D | 11.8 | 90.8 | 6.4 | 3.7 | 87.5 | 2.7 | 9.1 | 54.2 | 15.1 |
| 4A | 19.3 | 89.5 | 12.0 | | | | 12.0 | 48.9 | 14.0 |
| 4B | 17.5 | 89.7 | 10.7 | | | | 10.7 | 53.9 | 15.4 |
| 4C | 17.1 | 90.2 | 9.9 | | | | 9.9 | 51.3 | 14.6 |
| 4D | 11.4 | 90.1 | 6.7 | 4.6 | 86.2 | 3.8 | 10.5 | 57.9 | 16.5 |
| 5A | 14.5 | 89.4 | 9.1 | | | | 9.1 | 46.9 | 14.0 |

TABLE 3-continued

|   | Surimi Line Refiner | | | Experiment 4 Refiner | | | Total Yield (III) kg | Grand Total Yield (I + II + III) | Total Recovery (%) |
|---|---|---|---|---|---|---|---|---|---|
|   | Weight kg | Moisture % | Adjusted Weight kg | Weight kg | Moisture % | Adjusted Weight kg | | | |
| 5B | 12.6 | 88.6 | 8.5 | | | | 8.5 | 51.6 | 15.4 |
| 5C | 15.0 | 89.8 | 9.1 | | | | 9.1 | 56.3 | 16.8 |
| 5D | 10.3 | 90.1 | 6.0 | 2.9 | 87.7 | 2.1 | 8.1 | 56.4 | 16.9 |
| Average Yields Combining Data from 5 Trials (Experiments 1 through 5) | | | | | | | | | |
| A | 22.2 | 89.4 | 13.9 | | | | 13.9 | 50.3 | 14.0 |
| B | 16.0 | 89.6 | 9.9 | | | | 9.9 | 50.2 | 14.0 |
| C | 21.7 | 89.9 | 12.9 | | | | 12.9 | 57.4 | 16.0 |
| D | 10.9 | 90.5 | 6.1 | 4.5 | 86.5 | 6.7 | 12.8 | 56.9 | 15.9 |

Processes B, C and D all increased surface area to volume ratios of the mince. However, when assaying finished surimi with quality control criteria using surimi prepared and frozen from each of the four processes from each of the five s experiments, process C consistently produced surimi having the lowest moisture content and the highest average gel strength at all fish aging times sampled (Table 4 below). Processes A and C consistently produced surimi having similar whiteness and number of impurities scores. Process D produced surimi with lower gel strength and lower quality. Therefore, a third washing and dewatering cycle excessively hydrated the mince.

similar improvements in total recovery. In summary, these data demonstrate the advantage in surimi product and total recovery of the inventive process over the other surimi processes.

EXAMPLE 2

This example illustrates improvements in total recovery of surimi during a second fishing season using a surimi manufacturing process employing a mince crusher step utilizing refiner waste on a surimi factory trawler ship under commercial operation conditions. In this experiment, conducted onboard the F/V Golden Alaska, a mince crusher device was placed on board a

TABLE 4

|   | Moisture % | Impurities L (S) | Punch Force (g) | Punch Deflection (cm) | Gel Strength (g × cm) | Color (WB) |
|---|---|---|---|---|---|---|
| Test Results of Surimi Produced by 77 Akebono Maru | | | | | | |
| 1A | 73.4 | 36 (30) | 804 | 1.06 | 852 | 43.4 |
| 1B | 74.5 | 25 (34) | 704 | 1.12 | 788 | 44.2 |
| 1C | 74.4 | 27 (29) | 722 | 1.10 | 794 | 43.7 |
| 1D | 74.9 | 21 (33) | 644 | 1.11 | 715 | 45.2 |
| 2A | 74.6 | 26 (27) | 793 | 1.17 | 928 | 45.5 |
| 2B | 75.3 | 22 (29) | 729 | 1.18 | 860 | 45.6 |
| 2C | 75.1 | 15 (27) | 713 | 1.20 | 856 | 45.6 |
| 2D | 76.3 | 11 (22) | 536 | 1.16 | 622 | 46.8 |
| 3A | 74.4 | 16 (19) | 711 | 1.05 | 747 | 44.9 |
| 3B | 76.3 | 19 (16) | 551 | 1.15 | 634 | 45.7 |
| 3C | 75.4 | 23 (26) | 631 | 1.09 | 688 | 45.1 |
| 3D | 75.5 | 14 (20) | 539 | 1.03 | 555 | 46.6 |
| 4A | 74.0 | 19 (24) | 782 | 1.05 | 821 | 42.4 |
| 4B | 74.6 | 17 (26) | 623 | 1.09 | 679 | 43.6 |
| 4C | 74.8 | 21 (24) | 642 | 1.07 | 687 | 44.6 |
| 4D | 74.5 | 18 (19) | 590 | 1.00 | 590 | 43.9 |
| 5A | 74.3 | 12 (16) | 738 | 1.06 | 782 | 44.7 |
| 5B | 74.8 | 11 (18) | 619 | 1.11 | 687 | 45.1 |
| 5C | 74.6 | 10 (16) | 656 | 1.09 | 715 | 45.6 |
| 5D | 74.7 | 7 (15) | 647 | 1.01 | 653 | 45.1 |
| Average values combining data from 5 trials (1 through 5 above) | | | | | | |
| A | 74.1 | | 766 | 1.08 | 827 | 44.2 |
| B | 75.1 | | 645 | 1.13 | 729 | 45.1 |
| C | 74.9 | | 673 | 1.11 | 747 | 44.9 |
| D | 75.2 | | 591 | 1.06 | 626 | 45.5 |

[1]Moisture was determined by drying to constant weight in a hot air oven at 100° C.–105°.
[2]For the purposes of this test, impurities are defined as black membranes, small bones and other such nonmuscle inclusions. A 100 g sample of thawed surimi is stretched to 1 mm thickness or less. A score of 1 is given to objects 2 mm or more in diameter. A score of ½ is given to objects under 2 mm in diameter. Inconspicuous impurities less than 1 mm are excluded from this count.
[3]A Sun Kagaku, Ltd. Rheotex Model SD-305 rheometer with a 5 mm diameter plunger was used to determine punch force and punch deflection of the cooked gels. Samples for this test were prepared by the following procedure: Three to 5 kg of tempered surimi were ground in a silent cutter for 5 minutes, keeping the temperature below 10° C., then NaCl equal to 3% of the weight of the surimi was added and blended for a total chopping time of 15 minutes. Vinylidene chloride film casings of 48 mm folded diameter were each packed with approximately 150 g of the blended paste and tied at both ends. The stuffed casings were then cooked 40 minutes at 90° C.. Immediately after cooking the stuffed casings were dipped in cold water, then placed at room temperature until the internal temperature equilibrated between 20° C. and 30° C.. All samples were tested within 48 hours of cooking.
[4]Hunter whiteness values were determined using a Nippon Denshoku Co. Ltd. #ND-300A color meter.

Differences in gel strength between processes C and D at all fish aging times indicate a gel strength advantage to a process employing a mince crusher rather than an additional washing and dewatering step, despite surimi processing line between the first and second refiners to utilize refiner waste from the first refining step. The line that produced high grade surimi (SA+A)

did not employ a mince crusher. However, the line that produced a lower grade surimi (KA+B) used the mince crusher device to process waste product from the first refiner. The mince crusher device was calibrated to have a 1 mm uniform gap set between two rollers.

Calculations of total recovery of surimi over a fishing season, compared to total recovery during an earlier fishing season, found a 16.32% recovery of surimi using the inventive operation. This was compared with a 15.83% recovery achieved the previous years fishing season using a conventional process. The increased yield was a result solely of improved yield in the lower grade surimi product line. This experiment was plagued by unusual interruptions in the delivery of fish to the vessel, causing product losses due to surimi line interruptions (necessitating system cleaning to remove "hold-up" product capable of spoiling). Therefore, even greater yields could be expected under normal operating conditions.

We claim:

1. A process to produce higher grade surimi from the flesh of fish using less fresh water comprising:
   a. mincing fish flesh into mince particles;
   b. crushing the mince particles to increase the surface area: volume ratio of the mince particles;
   c. washing the crushed mince particles with fresh water to remove water soluble proteins;
   d. dewatering the washed mince particles;
   e. refining by straining the dewatered mince particles;
   f. dewatering the refined mince particles; and
   g. mixing additives with the refined dewatered mince particles to produce surimi.

2. The process of claim 1 wherein the crushing step is accomplished by a mince crushing device including a mincer drum having mesh openings, said crushing device having a gap distance between rollers, belts, or combinations thereof of from about 10% to about 50% of the diameter distance of said mesh openings.

3. The process of claim 2 wherein the gap distance of the mince crushing device is from about 0.5 mm to about 2.0 mm.

4. A process to produce lower grade surimi having improved quality and yield from flesh of fish comprising:
   a. mincing fish flesh into mince particles;
   b. washing the mince particles with fresh water to remove water soluble proteins;
   c. refining by straining the washed mince particles to generate refining waste for lower grade surimi;
   d. crushing the refining waste to increase the surface area: volume ratio of the refining waste;
   e. refining by straining the crushed waste; and
   f. dewatering the refined crushed waste; and
   g. mixing additives with the dewatered refined crushed waste to produce surimi.

5. The process of claim 4 wherein the crushing step is accomplished by a mince crushing device including a mincer drum having mesh openings, said crushing device having a gap distance between rollers, belts, or combinations thereof of from about 10% to about 50% of the diameter distance of said mesh openings.

6. The process of claim 5 wherein the gap distance of the mince crushing device is from about 0.5 mm to about 2.0 mm.

7. In a process for producing surimi from the flesh of fish comprising:
   a. preparing fish flesh from fish;
   b. mincing the fish flesh into mince particles;
   c. washing the mince particles with fresh water;
   d. dewatering the washed mince particles;
   e. repeating the washing and dewatering steps at least a second time;
   f. refining by straining and further dewatering the washed mince particles to create refined mince particles and refiner waste mince; and
   g. mixing additives with the dewatered and refined mince particles to produce surimi;
the improvement comprising:
   a. crushing the mince particles before washing to increase the surface area: volume ratio of the mince particles and eliminate one or more washing and dewatering steps;
   b. crushing the refiner waste mince; or
   c. a combination of a. and b.

8. The process of claim 7 wherein the crushing steps are accomplished by a mince crushing device including a mincer drum having mesh openings, said crushing device having a gap distance between rollers, belts, or combinations thereof, of from about 10% to about 50% of the diameter distance of said mesh openings.

9. The process of claim 8 wherein the gap distance of the mince crushing device is from about 0.5 mm to about 2.0 mm.

* * * * *